United States Patent
Kim

[11] Patent Number: 5,880,950
[45] Date of Patent: Mar. 9, 1999

[54] INVERTER DRIVING CIRCUIT FOR BRUSHLESS D.C. MOTOR

[75] Inventor: Hyo-Suk Kim, Suwon, Rep. of Korea

[73] Assignee: Samsung Electronics Co., Ltd., Rep. of Korea

[21] Appl. No.: 920,891

[22] Filed: Aug. 29, 1997

[30] Foreign Application Priority Data

Nov. 9, 1996 [KR] Rep. of Korea .................. 1996-39260

[51] Int. Cl.⁶ .................................................. H02M 5/45
[52] U.S. Cl. .............................. 363/98; 363/132; 323/902
[58] Field of Search .................................... 363/56, 37, 98, 363/132, 97, 131, 41, 136; 318/807, 810, 811, 812, 805, 798, 799; 323/902

[56] References Cited

U.S. PATENT DOCUMENTS

| | | | |
|---|---|---|---|
| 4,803,611 | 2/1989 | Sashida et al. | 363/98 |
| 4,905,135 | 2/1990 | Unehara et al. | 363/98 |
| 5,005,113 | 4/1991 | Ohtuka et al. | 363/37 |
| 5,499,175 | 3/1996 | Noro | 363/16 |
| 5,604,670 | 2/1997 | Sonoda | 363/56 |
| 5,731,681 | 3/1998 | Inaniwa et al. | 318/729 |

*Primary Examiner*—Adolf Deneke Berhane
*Attorney, Agent, or Firm*—Larson & Taylor

[57] ABSTRACT

This invention provides an inverter driving circuit for brushless d.c. motor adapted to pass PWM signal to switching elements of the inverter, enabling reduction of the manufacturing cost, the circuit including a general-purpose photocoupler for producing the PWM by virtue of an internal photo-coupling thereof, a reference voltage generating unit for producing the reference voltage signal, and a comparator which compares a signal from the general-purpose photocoupler with the reference voltage from the reference voltage generating unit, and passes the resultant as a switching element driving signal to appropriate switching element.

3 Claims, 4 Drawing Sheets

INVERTER DRIVING CIRCUIT FOR BRUSHLESS D.C. MOTOR

BACKGROUND OF THE INVENTION

1. Field of the Invention

The present invention relates to a brushless d.c. motor, and more particularly to an inverter driving circuit for brushless d.c. motor adapted to pass Pulse Width Modulated signal to switching elements of the inverter.

2. Description of the Prior Art

In general, a brushless d.c. motor is more and more used in fields where dangerous spark or arc phenomena is not supposed to be generated due to motor brushes or commutators. Also, the motor is often employed in an application such as in a hard disk where a constant speed operation is absolutely needed.

The brushless d.c. motor has a permanent magnet rotor and a stator armature winding excited by means of electrical switching. Rotation of the armature magnet field is accomplished using power transistors acting to change a direction of electric current flowing into the armature windings.

In order to synchronize the permanent magnet field and the rotation magnet field by the armature of the stator, a positional sensor is installed around a shaft of the rotor to ensure to be switched at an appropriate time.

Rotor position may be detected by sensing a voltage induced in the stator armature windings instead of using the position sensor. Driver for brushless d.c. motor designed based upon this principle consists of, as shown in FIG. 1, a filtering unit 1, a rectifying unit 2, a capacitor C, an inverter 3, a rotor-position detecting unit 5 for a brushless d.c. motor 4, a control unit 6, an inverter driving unit 7, and a power supply unit 8.

The filtering unit 1 serves to remove noise components embedded in A.C. power of 220 V, 60 Hz fed from the external and outputs the filtered A.C. power to the rectifying unit 2 which rectifies the A.C. power to produce a corresponding D.C. power needed in an inverter 3.

The inverter 3 consists of a plurality of switching elements Q1 to Q6, and a plurality of diodes D1 to D5, and switches the elements in response to the switching element driving signal input from the inverter driving unit 7, to supply 3-phase power of U, V and V phases to the brushless d.c. motor 4.

The rotor-position detecting unit 5 senses a voltage induced in each phase coil of the brushless d.c. motor for detecting the rotor position.

The control unit 6 is operated to switch the respective switching elements Q1 to Q6 under a user's manipulation to control the start-up, operation and speed of the motor. For these purposes, the control unit 6 produces switching element driving signals for use in switching the respective switching elements Q1 to Q6 in response to outputs from the rotor-position detecting unit 5 and then outputs them to the inverter driving unit 7.

The inverter driving portion 7 passes the switching element driving signal output from the control unit 6 to the respective switching elements Q1 to Q6 to switch those elements.

The power supply unit 8 transforms and rectifies the A.C. power input through the filtering unit 1 and then distributes the resultant power into the control unit 6 and the inverter driving unit 7 as the driving power VDC1 to VDC3.

The detailed circuit configuration of the inverter driving unit 7 is shown in FIG. 2, which is illustrative of the driving of U phase-related switching elements, but their operational principle is equally applicable to the other V and W phases-related switching elements.

The inverter driving unit 7 is constructed as illustrated in FIG. 2, which is only illustrative of the driving of U phase-related switching elements Q1, Q2, but their operational principle is equally applicable to the other V and W phases-related switching elements.

More detailed, the inverter driving portion 7 in FIG. 2 is comprised of a general-purpose photo-coupler PC1 and a high speed switching photo-coupler PC2. The general-purpose photo-coupler PC1 serves to pass, with an internal photo-coupling thereof, the switching element driving signal of low frequency from the control unit 6 to a base terminal of the first switching element Q1(or, PNP-type power transistor) in order to switch the element Q1 for a phase change.

The high speed switching photo-coupler PC2 receives the switching element driving signal of high frequency, or pulse width modulated signal from the control unit 6, in which the receipt of the signal can be made through an internal photo-coupling thereof, after shaping it, and then passes it to a base terminal of the second switching element Q2. This causes the second switching element Q2(or, NPN-type power transistor) to be switched, resulting in the supply of the power source to the stator armature windings of the brushless d.c. motor.

The power supply unit 8 provides various power source voltages DCV1, DVC2 and DVC3 to the control unit 6, general-purpose photo-coupler PC1 and high speed switching photo-coupler PC2, respectively, for their activation.

Reference symbols R1 to R4 and D1, D2 in the drawings denote resistors and diodes, respectively.

For the forgoing brushless d.c. motor, either an upper or lower switching elements in the inverter 3 may be switched at high speed by the PWM signal supplied thereto as a driving signal so as to result in the supply of the power source to the motor, wherein a pulse width of the PWM signal is varied for the control of the start-up and speed of the motor.

The PWM signal separated from the power source for the motor needs to use a photo-coupler for passing a signal to the proper switching element. The low frequency signal for driving a switching element, namely for a phase change is possibly passed to the relevant switching element via the general-purpose photo-coupler PC1, but a high speed switching photo-coupler has to be employed for preventing the distortion of the signal which is passed through the high speed switching photo-coupler. This is because a high frequency signal of the order of 20 KHz is used for the purpose of avoiding an audible noise.

The prior art inverter needs a plurality of high speed switching photo-couples assigned for each phase, but these photo-couplers cost high. This makes it difficult to adopt the high speed switching photo-coupler in the brushless d.c. motor.

SUMMARY OF THE INVENTION

Therefore, it is an object of the present invention to provide an inverter driving circuit which enables, even with a general-purpose photo-coupler, a deliver of a signal into a switching element.

The above objects are accomplished using an inverter driving circuit for brushless d.c. motor adapted to pass PWM signal to switching elements of the inverter, the circuit comprising:

a general-purpose photo-coupler for producing the PWM by virtue of an internal photo-coupling thereof;

a reference voltage generating unit for producing the reference voltage signal; and a comparator which compares a signal from the general-purpose photo-coupler with the reference voltage from the reference voltage generating unit, and passes the resultant as a switching element driving signal to appropriate switching element.

BRIEF DESCRIPTION OF THE DRAWINGS

Other objects and aspects of the invention will become apparent from the following description of embodiments with reference to the accompanying drawings in which.

DETAILED DESCRIPTION OF THE PREFERRED EMBODIMENT

The preferred embodiment according to the present invention will now be described in detail in accordance with the accompanying drawings.

Figure 3:
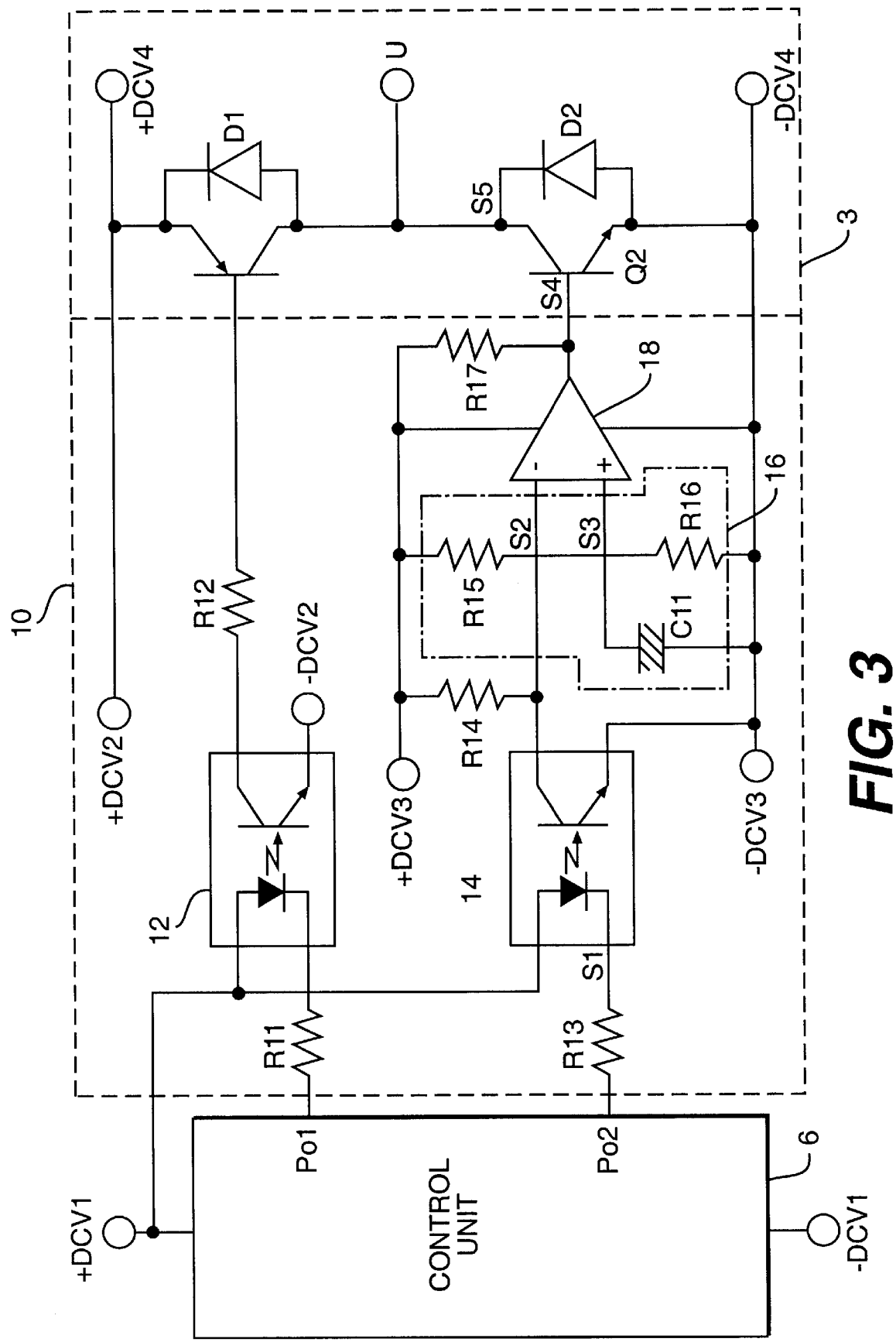
FIG. 3 shows a driving circuit for an inverter in accordance with the present invention.

FIG. 3 is a detailed circuit diagram of an inverter driving circuit in accordance with the present invention. This drawing is only illustrative of driving U phase-related switching elements Q1, Q2, but the configuration of which is identical to the configurations for another V, W phase-related switching elements.

The inverter circuit of the preferred invention includes a first general-purpose photo-coupler 12, a second general-purpose photo-coupler 14, a reference potential generating portion 16, and a comparator.

The first general-purpose photo-coupler 12 is used to pass a signal of low frequency for a phase change from a control unit 6 to a base terminal of a first switching element Q1(or, PNP-type power transistor) to be switched for a phase change, in which the signal pass is effected due to an internal photo-coupling of the first photo-coupler 12.

The second general-purpose photo-coupler 14 having the same operational mechanism as the first element 12 applies a signal of high frequency for a phase change, or pulse width modulated signal from the control unit 6 to an inverting terminal(-) of the comparator 18.

The reference potential generating portion 16 consists of resistors R15, R16 for dividing a certain level of potential VDC3 applied from an external power source and then for applying the divided potential to a non-inverting terminal(+) of the comparator 18, and a capacitor C11 for stabilizing a reference voltage which is applied to the non-inverting terminal(+) of said comparator 18.

The comparator 18 compares an output voltage from the second general-purpose photo-coupler 14 with the reference voltage input from the reference potential generating portion 16, and outputs a low level signal to the base terminal of the second switching element Q2 of the inverter 3 in case the output voltage level from the second general-purpose coupler 14 is higher than the reference voltage, otherwise, said base terminal receives a high level signal from the comparator 18.

At this time, the output signal from the comparator 18 is applied to the base terminal of the second switching element Q2 of the inverter 3 under the configuration of the open-collector type.

Reference symbols R11 to R17 denote resistors, and DCV1 to DCV3 denote the respective power source for driving the control unit 6, the first and second general-purpose photo-couplers, and the comparator, respectively.

The operation of the inverter driving circuit for a brushless d.c. motor in accordance with the present invention will be described with reference to the accompanying drawings.

Figure 1:
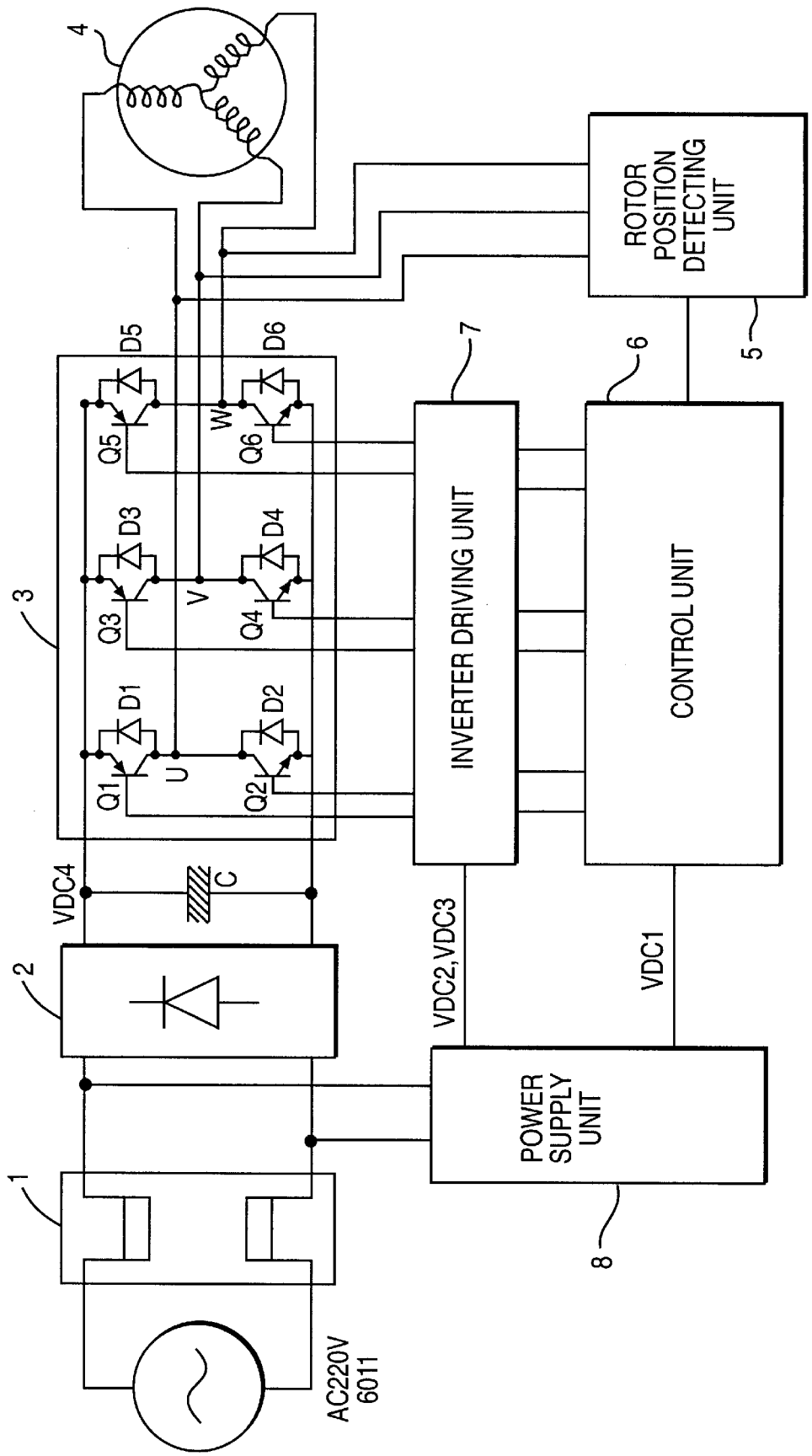
FIG. 1 shows schematically a conventional driver for brushless d.c. motor.
Figure 2:
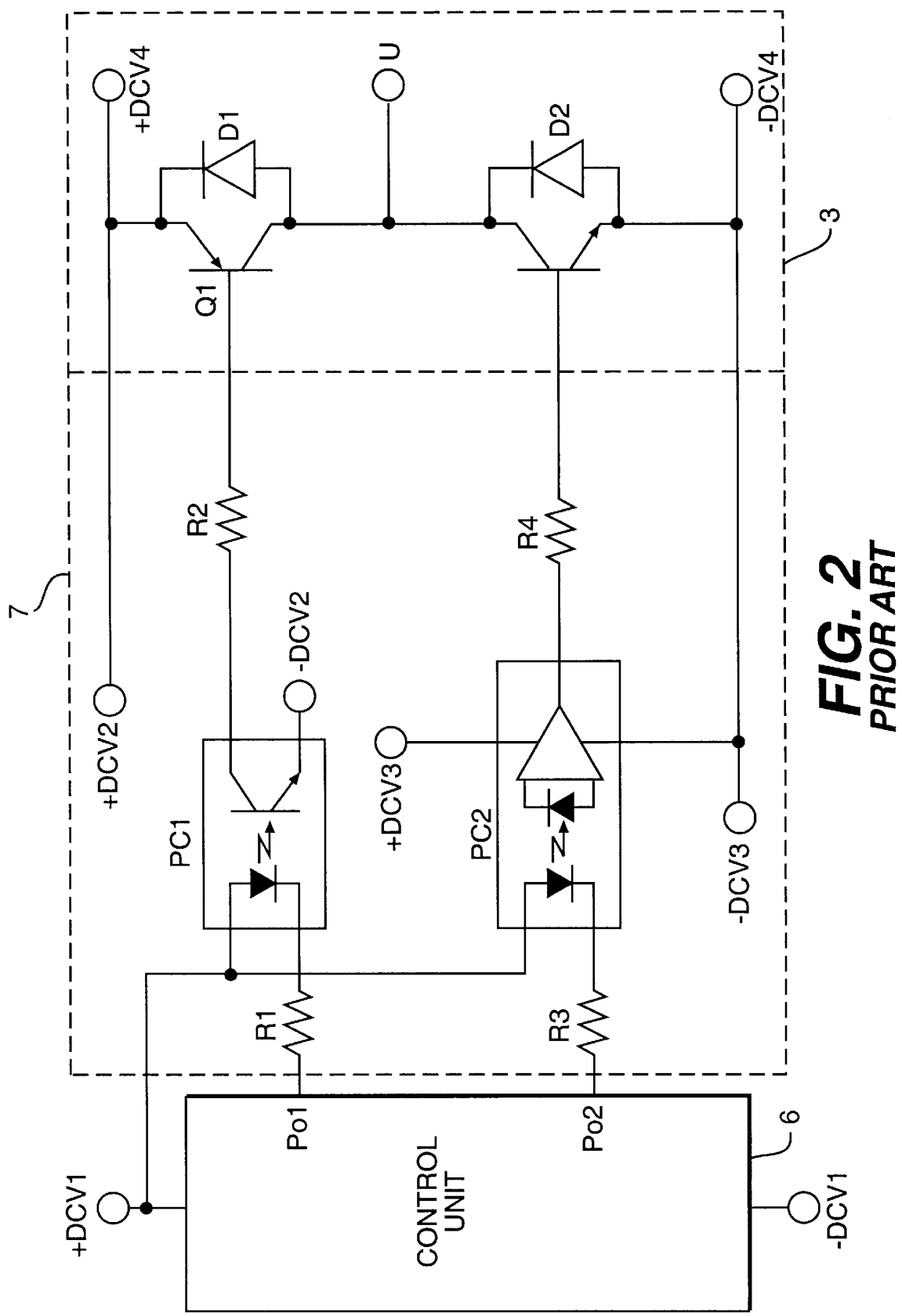
FIG. 2 shows a detailed circuit diagram of a driving unit for an inverter in FIG. 1.

As shown in FIG. 1, the inverter(3) in the driver for the brushless d.c. motor includes 6 switching elements Q1 to Q6 whose switching operations produce 3 phase power of U, V, and W to be applied to the stator amature windings of the motor 4 for rotating the motor 4.

Continuous rotation of the motor may be made by applying the delayed driving signal to the base terminals of the upper switching elements Q1, Q3, and Q5, wherein delay amount is determined by detecting a voltage induced in the rest of phase windings no power supplied and delaying it by 30-degree in electric angle after the induced voltage becomes '0' level.

Figure 4:
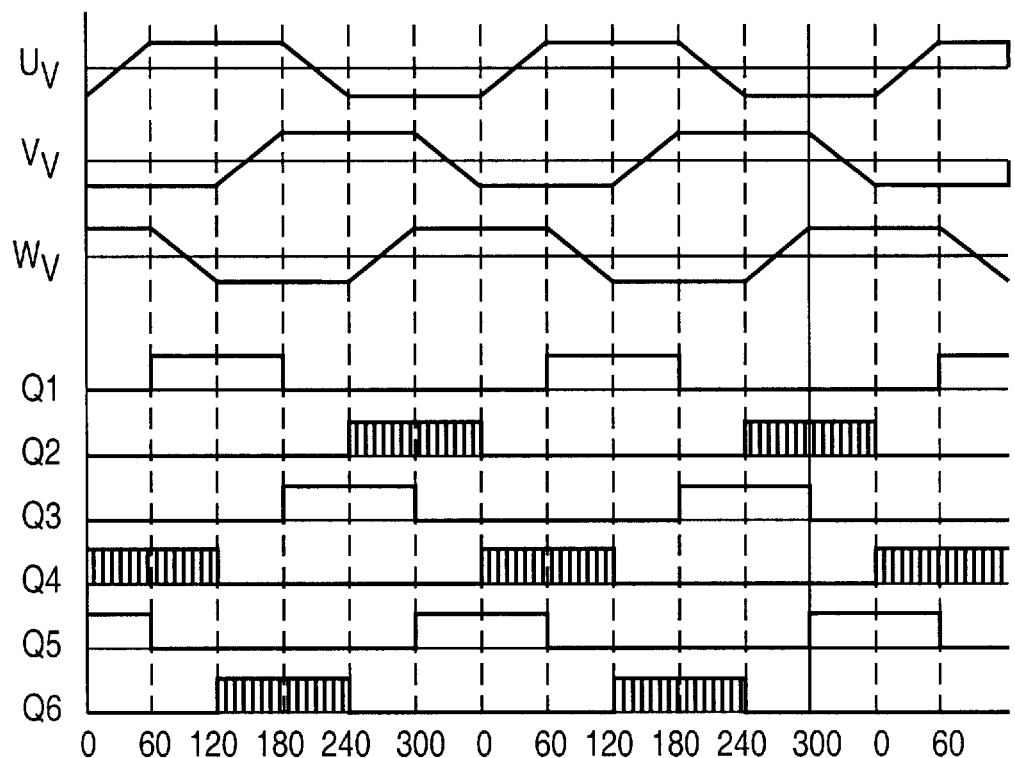
FIG. 4 shows waveforms which are illustrative of various driving signals for switching elements and the respective phases applied voltages, in operating the motor.

As shown in FIG. 4, during a period from 0-degree to 60-degree, a low frequency pulse used in driving the switching element is applied to the base terminal of the fifth switching element Q5 in order to perform the phase change, and a high frequency PWM signal for driving the switching element is applied to base terminal of the fourth switching element Q4. Turning on both the driven switching elements allows electric current to flow through W- and V-phases, resulting in the rotation of the motor. At this time, a voltage is induced in a U-phase, increasing from a negative region, passing through zero, to a positive region, due to the rotation of the rotor made of the permanent magnet.

The rotor-position detecting unit 5 illustrated in FIG. 1 senses a certain voltage induced in a U-phase and reports a time when the detected induction voltage reaches zero to the control unit 6. The control unit 6 then outputs a signal delayed by 30-degree to perform the phase change.

The fourth and first switching elements Q4 and Q1 are, respectively, turned off and on, such that electrical current can flow through U- and V-phases corresponding to the positions at which the motor has been rotated, so as to continue to rotate the motor in consequence.

The first general-purpose photo-coupler 12 is used to pass a signal of low frequency from a control unit 6 to a base terminal of a first switching element Q1 of a U-phase to be switched for a phase change, in which the signal pass is effected due to an internal photo-coupling of the first photo-coupler 12.

In order to switch the U-phase lower switching element Q2, the switching element driving signal of high frequency, or PWM signal from the control unit 6 is passed to an inverting terminal (-) of the comparator 18 by virtue of the internal photo-coupling of the second general-purpose photo-coupler 14.

Figure 5:
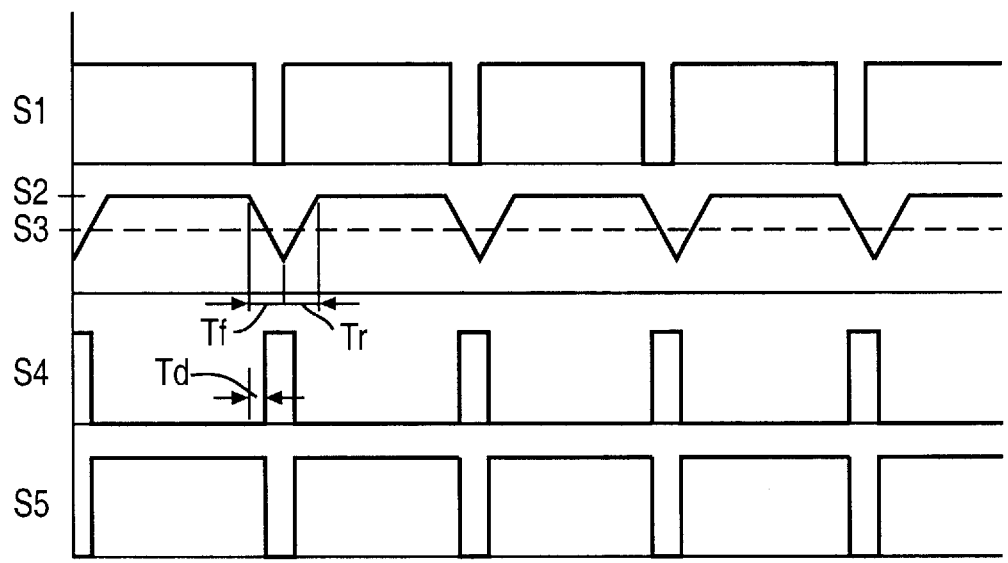
FIG. 5 shows waveforms of the driving circuit for the inverter in accordance with the present invention.

Since the signal for driving the switching element and only for performing the phase change is of a low frequency, the first switching element Q1 may be turned on or off when the driving signal is passed to the first switching element in the inverter 3 via the general-purpose photo-coupler. However, an output from the general-purpose photo-coupler cannot be used in switching the second switching element Q1, in that the PWM signal passed to the second switching element Q2 is of high frequency. As shown in FIG. 5, in case the PWM signal S1 of high frequency is output from the control unit 6, especially duty ratio thereof being smaller, an inherent delay characteristics of the general-purpose photo-coupler causes occurrences of both rising and falling times Tf and Tr in the output signal S2 from the first general-purpose photo-coupler 14. As a result, even before the PWM signal drops to 'low' level, this signal again rises towards 'high' level. This signal causes the second switching element Q2 when said signal is applied thereto to be continuously turned on, thereby followed by the reprocessing of the signal output from the second general-purpose photo-coupler 14, inevitably.

To the non-inverting terminal (+) of the comparator 18 is applied a reference voltage S3 produced from the resistors R15, R16 implementing the reference voltage generating unit 16 which are configured to divide the external power supply VDC3, and a capacitor C11 in the reference voltage generating unit 16 stabilizes the reference voltage applied to the inverting terminal(+) of the comparator 18.

Comparison of the voltage output from the second general-purpose photo-coupler 14 with the reference voltage input from the reference voltage generating unit 16 is made in the comparator 18 which outputs the driving signal S4 for the second switching element Q2 in response thereto.

If the voltage from the second photo-coupler 14 is higher than that of the reference voltage in level, 'low' level signal is output to the base terminal of the second switching element Q2, otherwise, said terminal receives high level signal.

The above reference voltage can vary with the adjusted resistances of the resistors R15, R16 for obtaining appropriate level adjusted. Variation in resistances for establishing the required level of reference voltage may be determined based upon the duty ratio of the PWM signal, such that the comparator 18 can output the same as the above PWM signal through the desired number of on/off for the second switching element Q2.

It is apparent that variable resistors may substitute for the used resistors R15, R16.

Moreover, the output signal S4 from the comparator 18 is of an open collector-type, whose output is applied to the base terminal of the second switching element Q2 and has the constant delay time td as shown in FIG. 5.

However, extremely smaller delay time td has no influence upon the timing of driving the switching element Q2.

In addition, an emitter terminal of the second switching element Q2 receives a signal S4 output from the comparator 18, as shown in FIG. 5.

As described the foregoing, the present invention greatly reduces the cost needed to make the apparatus using the general-purpose photo-coupler in passing the PWM signal to the switching elements of the inverter, over the prior art requiring the use of the high speed switching photo-coupler.

What is claimed is:

1. An inverter driving circuit for brushless d.c. motor adapted to supply a pulse width modulated signal to switching elements of an inverter, the circuit comprising:

a first general-purpose photo-coupler for producing, by virtue of an internal photo-coupling thereof, a low frequency signal as a first switching element driving signal for a first switching element of the inverter, a second general-purpose photo-coupler for producing the pulse width modulated signal by virtue of an internal photo-coupling thereof;

a reference voltage generating unit for producing a reference voltage signal; and a comparator which compares said signal from the second purpose photo-coupler with the reference voltage from the reference voltage generating unit and which provides a resultant output as a second switching element driving signal to a further switching element of the inverter.

2. The circuit as defined in claim 1, wherein the reference voltage generating unit comprises:

resistors arranged to divide an externally supplied voltage and to apply it to the comparator as a reference voltage; and a capacitor for stabilizing said reference voltage applied to the comparator through the resistors.

3. The circuit as defined in claim 1, wherein the comparator is configured such that the switching element driving signal is produced under one-collector wired structure.

* * * * *